United States Patent [19]

Masuda

[11] Patent Number: 5,298,718
[45] Date of Patent: Mar. 29, 1994

[54] OPTICAL ELEMENT MANUFACTURING METHOD AND A WAFER

[75] Inventor: Hisashi Masuda, Tokyo, Japan

[73] Assignee: Sony Corporation, Tokyo, Japan

[21] Appl. No.: 979,257

[22] Filed: Nov. 20, 1992

[30] Foreign Application Priority Data

Nov. 22, 1991 [JP] Japan ................... 3-334154

[51] Int. Cl.$^5$ ............................................. B23K 26/00
[52] U.S. Cl. ............................. 219/121.72; 219/121.83
[58] Field of Search .................. 219/121.67, 121.72, 219/121.83; 372/22, 21; 356/108

[56] References Cited

U.S. PATENT DOCUMENTS 3,720,471  3/1973  Kasahara et al. ............... 356/108
5,245,618  9/1993  Masuda et al. .................. 372/22

FOREIGN PATENT DOCUMENTS 0398570  11/1990  European Pat. Off. .
1046898  12/1958  Fed. Rep. of Germany .

*Primary Examiner*—C. L. Albritton
*Attorney, Agent, or Firm*—Hill, Steadman & Simpson

[57] ABSTRACT

An optical element manufacturing method comprises steps of: preparing a wafer having opposite surfaces the extension of which intersecting each other at a predetermined angle; irradiating the wafer with a laser beam to form fringes on the wafer and displaying the fringes on a display for observation; determining cutting lines on the wafer with reference to the positions of the fringes; and cutting the wafer along the cutting lines to obtain a plurality of optical elements. By using method mentioned above, a nonlinear optical crystal element having an inclined plane can be produced in quantities.

8 Claims, 6 Drawing Sheets

FIG. I

OPTICAL ELEMENT MANUFACTURING METHOD AND A WAFER

BACKGROUND OF THE INVENTION

1. Field of the Invention

The present invention relates to an optical element manufacturing method suitable for manufacturing a nonlinear optical crystal element to be employed in a second harmonic laser, and a wafer.

2. Description of the Prior Art

The applicant of the present patent application proposed previously a laser as shown in FIG. 1 capable of stably emitting a laser beam in Japanese Patent Application No. Hei 3-17068 (hereinafter referred to as "cited reference"). Referring to FIG. 1, a pumping laser beam emitted by a laser diode 1 impinges on lens 2, travels through a concave mirror 3 and a quarter-wave plate 4, and impinges on a laser medium 5, such as a Nd:YAG laser medium. Upon the reception of the pumping laser beam, the laser medium 5 emits a fundamental laser beam $LA(\omega)$. Then, the fundamental laser beam $LA(\omega)$ travels through a nonlinear optical crystal element 6 and impinges on a plane mirror 7. The fundamental laser beam reflected by the plane mirror 7 travels through the nonlinear optical crystal element 6 and falls again on the laser medium 5. The fundamental laser beam travels to the left, as viewed in FIG. 1 through the quarter-wave plate 4 falls on the concave mirror 3 and is reflected by the concave mirror 3. The fundamental laser beam reflected by the concave mirror 3 travels through the quarter-wave plate and impinges again on the laser medium 5.

Thus, the fundamental laser beam shuttles between the concave mirror 3 and the plane mirror 7. The concave mirror 3, the quarter-wave plate 4, the laser medium 5, the nonlinear optical crystal element 6 and the plane mirror 7 form a laser resonator 8. A KTP (a single-axis uniaxial KTiOPO$_4$ crystal) generates a second harmonic laser beam $LA(2\omega)$ of a frequency twice that of the fundamental laser beam $LA(\omega)$ by type II phase matching. The plane mirror 7 reflects the fundamental laser beam $LA(\omega)$ substantially entirely and transmits the second harmonic laser beam $LA(2\omega)$ substantially entirely. Consequently, the laser resonator 8 emits the second harmonic laser beam.

It is expected that the oscillation of polarized light of a mode nearest to the peak of gain occurs in a homogeneous line broadening laser, such as a solid-state laser, and single mode oscillation occurs due to the saturation of gain. However, actually, multimode oscillation occurs, in some cases, due to the effect of spatial hole burning; that is, when a standing wave a is generated by the laser resonator 8, an oscillation b of a different mode occurs as shown in FIG. 2 because the gain is not saturated sufficiently at the nodes of the standing wave.

The plane 6a of incidence of the nonlinear optical crystal element 6 on which the fundamental laser beam impinges of the laser previously proposed in the cited reference is inclined to the optical axis LA1 of the fundamental laser beam to suppress the effect of spatial hole burning. When the plane 6a of incidence of the nonlinear optical crystal element 6 is thus inclined to the optical axis LA1, the effective optical path length of the nonlinear optical crystal element 6 can be accurately adjusted to a predetermined value by adjusting the position of the nonlinear optical crystal element 6 with respect to a direction indicated by the arrow T perpendicular to the optical axis LA1. The position of the nonlinear optical crystal element 6 is thus adjusted so that the quantity of double refraction caused by the nonlinear optical crystal element 6 is exactly 90°. Naturally, the plane 6b of exit of the nonlinear optical crystal element 6, as well as the plane 6a of incidence, may be inclined to the optical axis LA1.

The effect of adjusting the quantity of double refraction, i.e., phase difference, caused by the nonlinear optical crystal element 6 to 90° will be described hereinafter. The fundamental laser beam emitted by the laser medium 5 is a circularly polarized laser beam. The fundamental laser beam is changed to a linearly polarized laser beam by the quarter-wave plate 4. The linearly polarized fundamental laser beam is reflected by the concave mirror 3 so as to travel through the quarter-wave plate 4, the linearly polarized fundamental laser beam changes again to a reverse-circularly polarized fundamental laser beam. Then, the reverse-circularly polarized fundamental laser beam travels through the laser medium 5 and impinges on the nonlinear optical crystal element 6. Since the quantity of double refraction of the nonlinear optical crystal element 6 is adjusted accurately to 90°, a linearly polarized fundamental laser beam goes out of the nonlinear optical crystal element 6. The linearly polarized fundamental laser beam is reflected by the plane mirror 7 and travels again through the nonlinear optical crystal element 6, whereby the linearly polarized laser beam changes again to the original circularly polarized laser beam. Thus, the fundamental laser beam that travels through the laser medium 5 is always reverse-circularly polarized, the spatial hole burning effect is suppressed by what is called a twist mode effect, which is described in, for example, Applied Optics, Vol. 4, No. 1 (January 1965).

Although the laser employing the nonlinear optical crystal element 6 having the inclined plane 6a of incidence or the inclined plane 6b of exit is proposed in the cited reference, nothing about a method of manufacturing such a laser is proposed in the cited reference.

SUMMARY OF THE INVENTION

Accordingly, it is an object of the present invention to provide a method of mass-producing a nonlinear optical crystal element having an inclined plane.

An optical element manufacturing method in one aspect of the present invention irradiates a wafer 31 having opposite surfaces the extensions of which intersecting each other at a predetermined angle $\alpha$ with a laser beam, observes fringes formed on the wafer 31, and cuts the wafer 31 at predetermined positions with reference to the fringes to provide nonlinear optical crystal elements 6, i.e. optical elements.

The wafer 6 having the opposite surfaces the extensions of which intersecting each other at the predetermined angle $\alpha$ is cut at the predetermined positions to provide a plurality of nonlinear optical crystal elements 6, i.e., optical elements, and the sum of the size t of portions to be cut off and the size s of the optical elements is an integral multiple of the pitch $\Delta x$ of the fringes formed on the wafer 31 when the same is irradiated with a laser beam.

Thus, a plurality of nonlinear optical crystal elements 6 can be produced by cutting the wafer 31 at the predetermined positions determined with reference to the fringes formed on the wafer 31 by irradiating the wafer 31 with the laser beam.

Since the size $\underline{t}$ of the portion cut off and the size $\underline{s}$ of the nonlinear optical crystal elements 6 is an integral multiple of the pitch of the fringes formed by irradiating the wafer 31 with the laser beam, a plurality of nonlinear optical crystal elements 6 can be formed by cutting the wafer 31.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
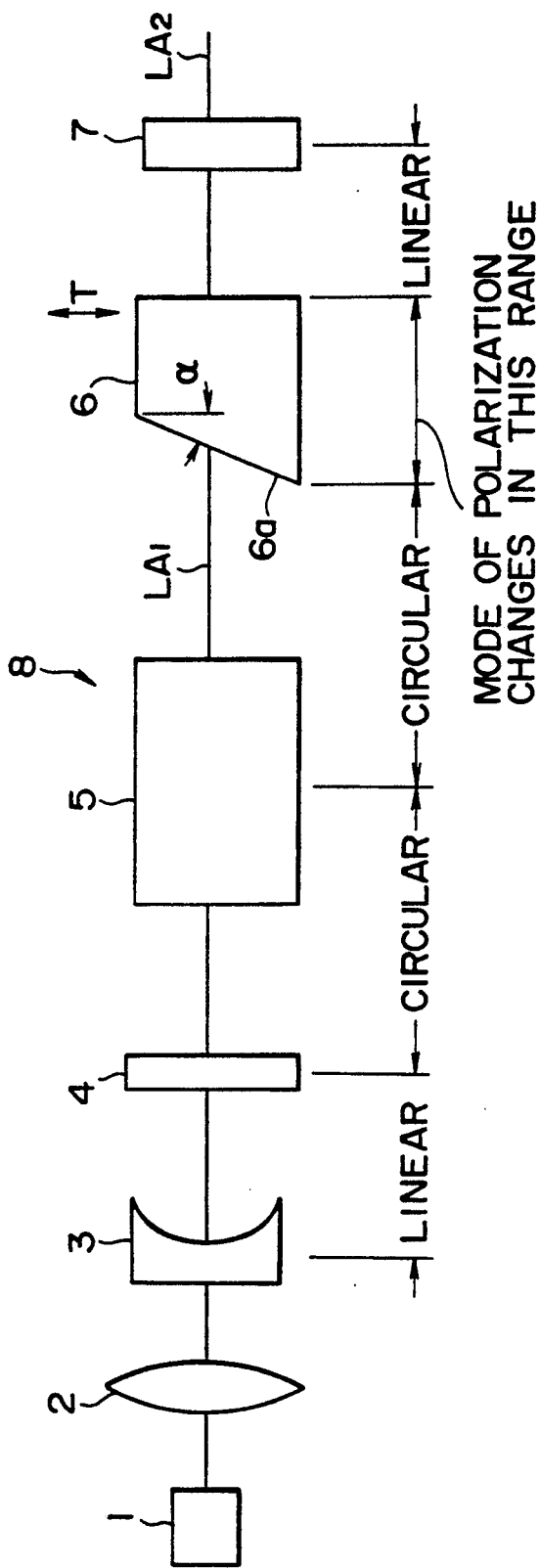
FIG. 1 is a diagrammatic view of a laser proposed previously in the cited reference.
Figure 2:
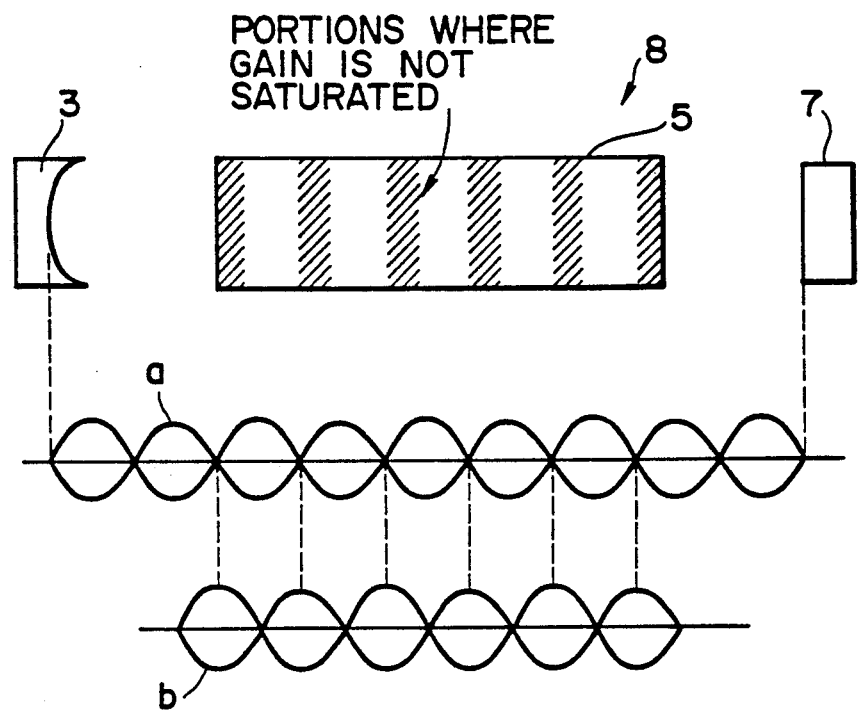
FIG. 2 is a diagrammatic view of assistance in explaining the effect of spatial hole burning.
Figure 4B:
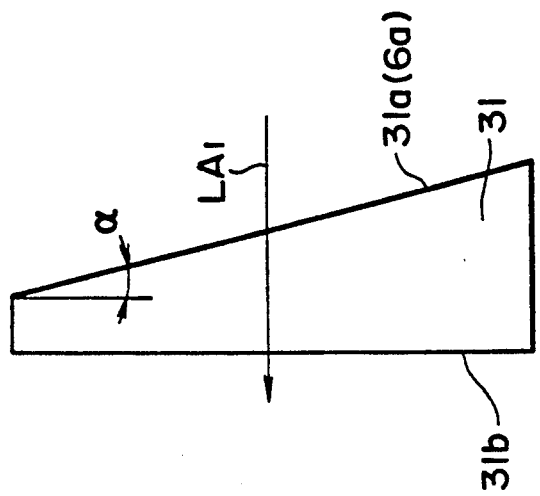
FIGS. 4A and 4B are perspective view and a side view, respectively, of a wafer 31 shown in FIG. 3.
Figure 4A:
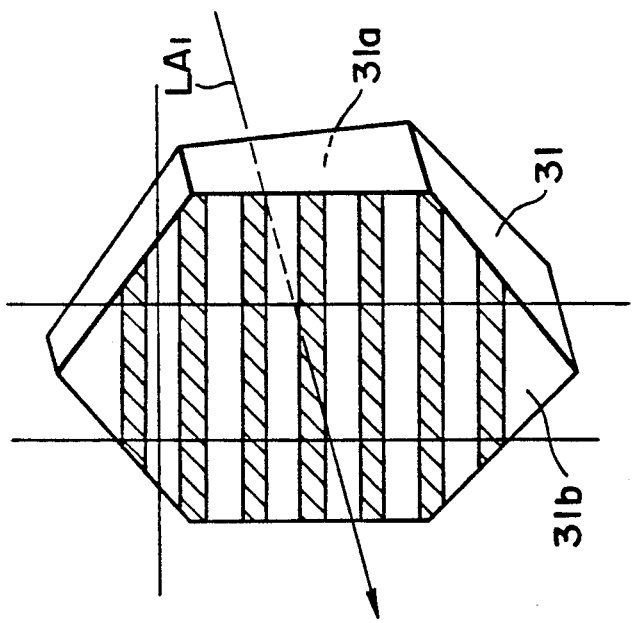

The nonlinear optical crystal element 6 having the plane 6a of incidence and a plane 6b of exit as shown in FIG. 1 is formed by processing a wafer 31 as shown in FIGS. 4A and 4B. The wafer 31 has a plane 31a of incidence and a plane 31b of exit. The plane 31a of incidence is inclined at an angle $\alpha$ to the plane 31b of exit.

Figure 5:
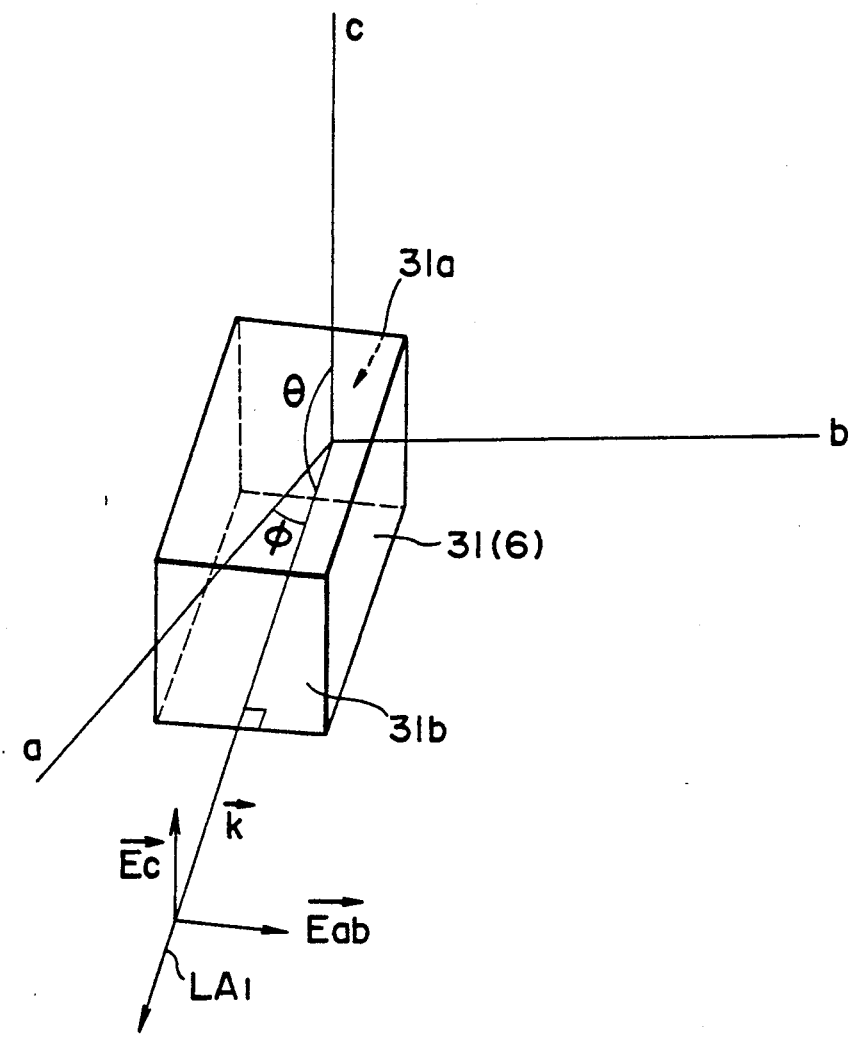
FIG. 5 is a diagram of assistance in explaining the relation between the optical wafer 31 shown in FIG. 3 and the crystallographic axes of the wafer 31.

Referring to FIG. 5 showing the relation between the three axes $\underline{a}$, $\underline{b}$ and $\underline{c}$ of the wafer 31 perpendicular to each other and an optical axis LA1, the optical axis LA1 is included in an $\underline{a\text{-}b}$ plane defined by the axes $\underline{a}$ and $\underline{b}$, and is inclined at an angle $\phi$ to the axis $\underline{a}$. In this embodiment, the angle $\phi$ is about 23° to 25°. Included in the $\underline{a\text{-}b}$ plane, the optical axis LA1 is perpendicular to the axis $\underline{c}$. Such a positional relation between the optical axis LA1 and the three axes $\underline{a}$, $\underline{b}$ and $\underline{c}$ enables the most efficient generation of a second harmonic. A light beam that travels along the optical axis LA1 can be divided into a polarized light beam Ec (vector) and a polarized light beam Eab (vector) perpendicular to the polarized light beam Ec and the optical axis LA1. The two polarized light beam Ec and Eab are refracted in different modes, respectively, by the wafer 31 (a nonlinear optical crystal 6 of KTP); that is, the refractive index of the wafer 31 for the polarized light beam Ec is $n_c$ and that of the wafer 31 for the polarized light beam Eab is $n_{ab}$. The refractive indices $n_a$, $n_b$ and $n_c$ of a KTP crystal grown by a flux method for a light beam of 1064 nm in wavelength at 20° C. are: $n_a = 1.7404$, $n_b = 1.7470$ and $n_c = 1.8304$.

Accordingly, $$n_{ab} = 1/\{(\sin^2\phi)/n_{a2} + (\cos^2\phi)/n_{b2}\}^{\frac{1}{2}}$$

From this expression, $n_{ab} = 1.7464$ and the difference $\Delta n(\omega)$ between the refractive indices $n_{ab}$ and $n_c$ is 0.08463 when $\phi = 25°$.

Figure 7:
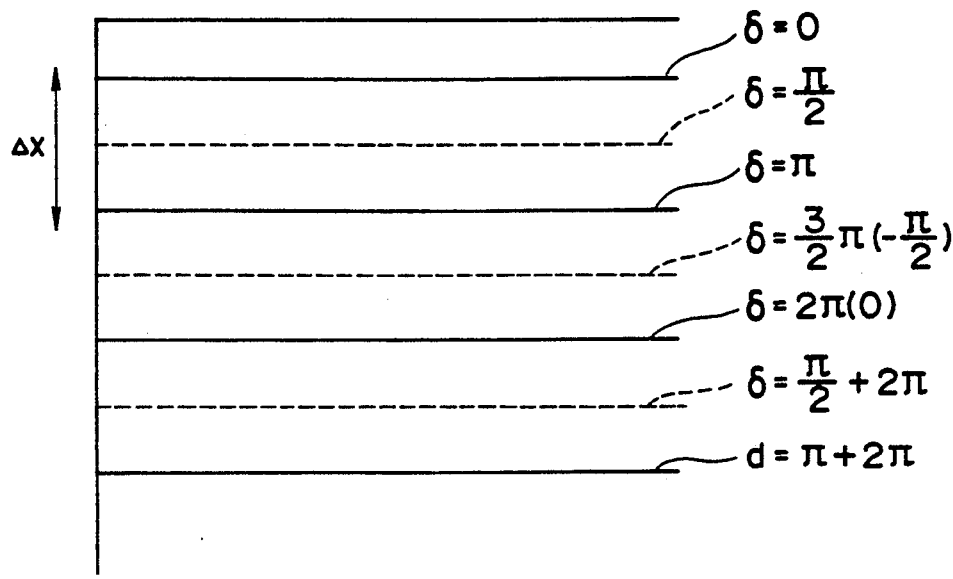
FIG. 7 is a diagram of assistance in explaining the periodicity of the phase difference of the wafer 31 shown in FIG. 3.
Figure 8:
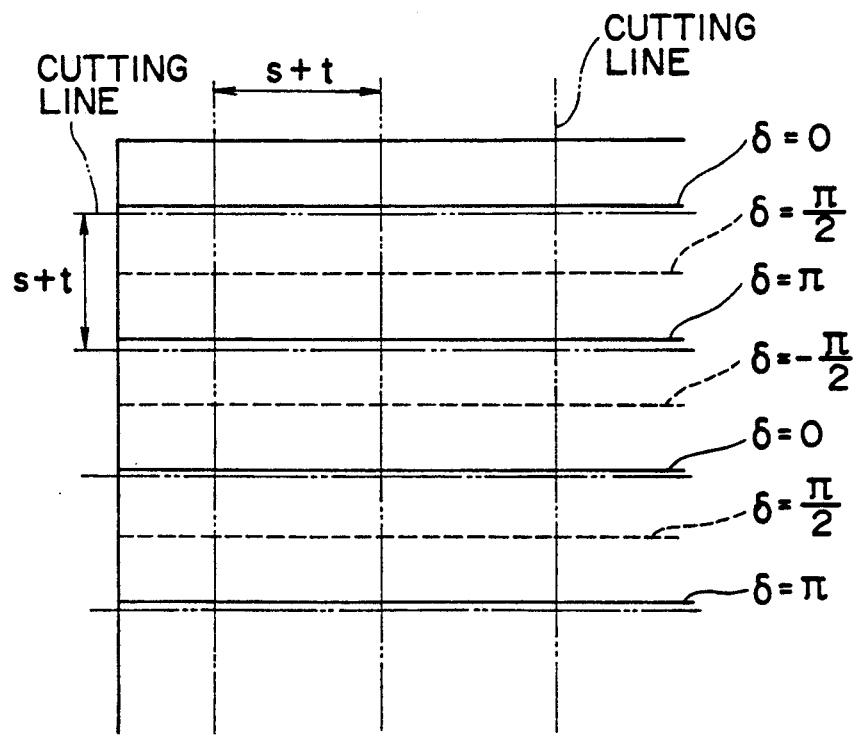
FIG. 8 is a diagram of assistance in explaining the relation between the periodicity of the phase difference of the wafer 31 shown in FIG. 3 and cutting positions.

Since the plane 31b of exit is perpendicular to the optical axis LA1, and the plane 31a of incidence is inclined at the angle $\alpha$ to the plane 31b of exit, the phase difference of the light beam that travels through the wafer 31 varies periodically with position. As shown in FIG. 7, when the phase difference is 0 at a predetermined position, the phase difference is $\pi$ at a position at a distance $\Delta x$ from the predetermined position and the phase difference is $2\pi$ (0) at a position at a distance $2\Delta x$ from the predetermined position. Therefore, the phase difference is $\pi/2$ at the middle between the predetermined position where the phase difference is 0 and the position where the phase difference is $\pi$, and the phase difference is $3\pi/2$ ($-\pi/2$) at the middle between the position where the phase difference is $\pi$ and the position where the phase difference is $2\pi$.

Figure 6A:
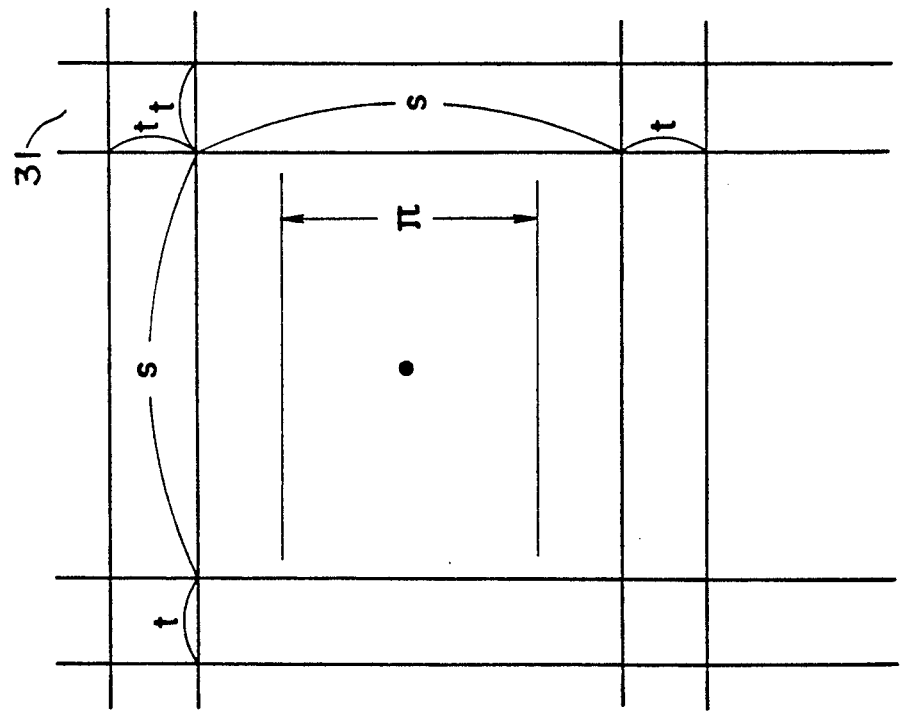
FIGS. 6A and 6B are diagrams showing cutting positions where the wafer 31 shown in FIG. 3 is cut and the size of the optical element.
Figure 6B:
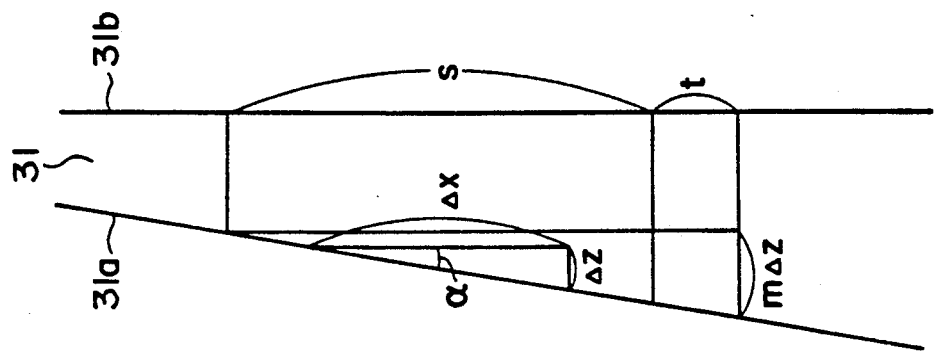

Referring to FIG. 6B, suppose that the height varies by $\Delta z$ in a distance $\Delta x$. Then, $$\tan \alpha = \Delta z / \Delta x$$

Since $(2\pi \cdot \Delta n(\omega) \cdot \Delta z)\lambda = \pi$ $$\Delta z = \lambda / 2\Delta n(\omega)$$

Therefore, $$\Delta x = \Delta z / \tan \alpha = (\lambda / 2\Delta n(\omega)) \cdot \tan \alpha$$

A plurality of nonlinear optical crystal elements 6 of $s \times s$ can be obtained by cutting off portions of a width $\underline{t}$ of the wafer 31 as shown in FIG. 6A meeting an expression:

$$m\Delta x = s + t$$

where m is an integer.

When, for example, the distance $\Delta x$ between the position where the phase difference is 0 ($2n\pi$) and the position where the phase difference is $\pi$ ($(2n+1)\pi$) is $s + t$, and the nonlinear optical crystal element 6 is formed by cutting the wafer 31 at positions where the phase difference is 0 or $\pi$, the phase difference is $\pi/2$ at the center of the nonlinear optical crystal element 6. However, in general, the size of the nonlinear optical crystal element 6 is very small when $\Delta x = s + t$. Therefore, the nonlinear optical crystal element 6 having a practically acceptable size can be formed when the value of $s + t$ is an integral multiple of $\Delta x$.

When the wavelength t of a laser beam emitted by a ND:YAG laser is 1.064 μm, $\Delta n(\omega)$ is 0.08463, $\underline{s}$ is 2 mm, t is 0.3 mm and $\alpha$ is in the range of 0.30°, to 0.60°, a desirable value of $\underline{m}$ is in the range of 2 to 4.

m=2: $\alpha = 0.30° \pm 0.015°$
m=3: $\alpha = 0.45° \pm 0.023°$
m=4: $\alpha = 0.60° \pm 0.030°$ For example, when a $\alpha = 0.45°$, the thickness difference between the upper and lower edges of each strip to be cut out from the wafer 31 is 18.9 μm. Therefore, about ten strips can be cut out from the wafer 31 if thickness allowance is ±0.1 mm.

Figure 3:
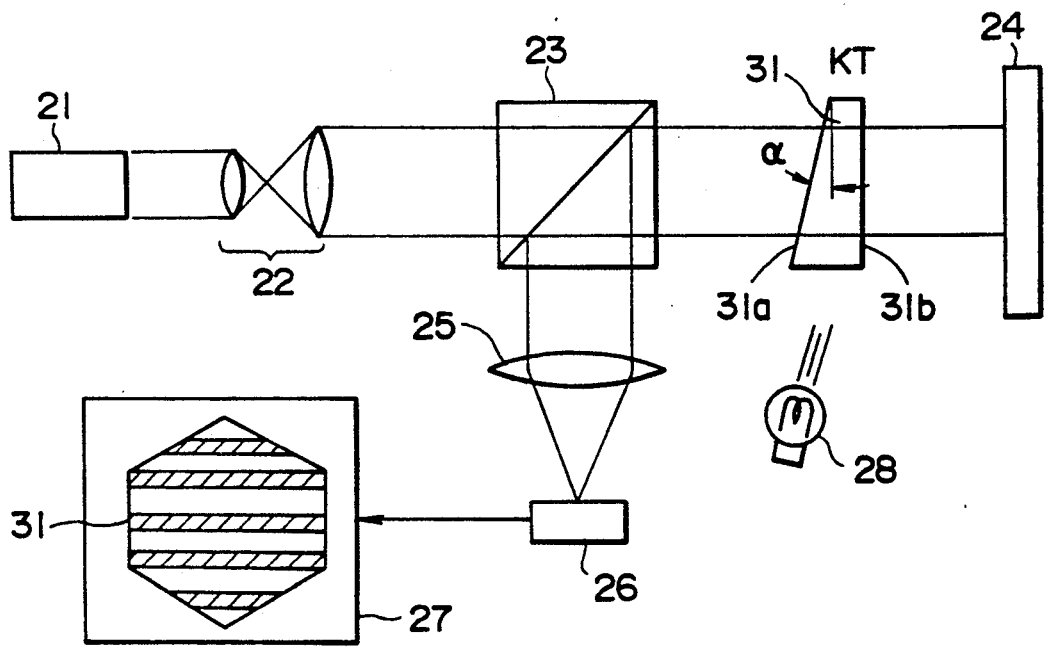
FIG. 3 is a diagrammatic view of an apparatus for manufacturing an optical element manufacturing method in a preferred embodiment according to the present invention.

FIG. 3 shows an apparatus for producing a plurality of nonlinear optical crystal elements 6 form on wafer 31 on the basis of the foregoing principle. Referring to FIG. 3, the apparatus is provided with a laser 21 that emits a laser beam of the same wavelength as that of a laser beam to be applied to the nonlinear optical crystal element 6. A beam expander 22 expands the laser beam emitted by the laser 21. A polarizing beam splitter 23 separates the expanded laser beam traveling from the beam expander 22 toward the wafer 31 and a light beam traveling from the wafer 31 toward the beam expander 22 from each other. A mirror 24 reflects the light beam received from the wafer 31 toward the wafer 31. A lens 25 focuses the light beam separated by the polarizing beam splitter 23 on a CCD 26, i.e., an image pickup device. The lens 25 and the CCD 26 may be substituted by a video camera. The output of the CCD 26 is given to a display 27, such as a CRT (cathode-ray tube) or a LCD (liquid crystal display). If necessary, the wafer 31 disposed between the polarizing beam splitter 23 and the mirror 24 is illuminated with white light emitted by a lamp 28.

In operation, the laser beam emitted by the laser 21 travels through the beam expander 22 and the polarizing beam splitter 23 and falls on the wafer 31. The laser beam passed through the wafer 31 is reflected by the mirror 24, travels through the wafer 31 again, falls on the polarizing beam splitter 23 and is reflected by the polarizing beam splitter 23. The laser beam reflected by the polarizing beam splitter 23 is focused on the CCD 26 by the lens 25. Since the plane 31a of incidence of the wafer 31 is inclined at the angle $\alpha$ to the plane 31b of exit of the same as mentioned above, portions of the wafer 31 where the predetermined phase difference is obtained appear periodically on the wafer 31 and the periodicity is detected by the polarizing beam splitter 23 and the periodic portions are displayed in fringes of a pitch $\Delta x$ on the display 27. The display 27 displays a pattern of the fringes enlarged at a predetermined magnification.

Although the fringes corresponding to the phase difference can be observed by irradiating the wafer 31 with the laser beam, it is scarcely possible to recognize the contour of the wafer 31. Therefore, the laser 21 is stopped and the lamp 28 is turned on to illuminate the wafer 31 with white light, the image of the wafer 31 is detected by the CCD 26 and the image of the wafer 31 showing the contour of the wafer 31 is displayed clearly on the display 27.

Thus, the fringes formed by irradiating the wafer 31 with the laser beam and the picture showing the contour of the wafer 31 are superposed on the display 27 to enable the positional definition of the fringes on the wafer 31. Then, cutting lines on the wafer 31 are specified with reference to the fringes, observing the composite picture of the fringes and the contour of the wafer 31 displayed on the display 27. The wafer 31 is cut along the cutting lines to obtain a plurality of nonlinear optical crystal elements 6.

Thus, the optical element manufacturing method in accordance with the present invention enables simply and surely obtaining a plurality of optical elements from a single wafer at a reduced manufacturing cost.

Furthermore, since the sum of the size of the optical element and that of portions cut off and removed from the wafer is an integral multiple of the pitch of the fringes, a plurality of optical elements can be obtained from a single wafer.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. An optical element manufacturing method comprising steps of:
    preparing a wafer having opposite surfaces the extension of which intersecting each other at a predetermined angle;
    irradiating the wafer with a laser beam to form fringes on the wafer and displaying the fringes on a display for observation;
    determining cutting lines on the wafer with reference to the positions of the fringes; and
    cutting the wafer along the cutting lines to obtain a plurality of optical elements.

2. An optical element manufacturing method according to claim 1, wherein the cutting lines corresponds to positions where the phase difference is 0 or $\pi$ with reference to the positions of the fringes.

3. An optical element manufacturing method according to claim 2, wherein each cutting line meets an expression:

$$m\Delta x = s + t$$

where $\Delta x$ is the distance between a predetermined position on the wafer where the phase difference is 0 and a position where the phase difference is $\pi$, $\underline{s}$ is the size of the optical element and t is the size of portions of the wafer to be cut off.

4. A wafer to be divided by cutting to provide a plurality of optical elements, having opposite surfaces the extensions of which intersecting each other at a predetermined angle, and the sum of the size of portions to be cut off and that of the optical elements is an integral multiple of the pitch of fringes formed on the wafer by irradiating the wafer with a laser beam.

5. A method of manufacturing a nonlinear optical crystal element which is made to generate a second harmonic by the output light beam of a ND:YAG laser provided within a laser resonator so as to be irradiated with a laser beam emitted by an exciting laser, said method comprising:
    preparing a wafer of KTP having opposite surfaces the extensions of which intersecting each other at a predetermined angle;
    irradiating the wafer with a laser beam to form fringes on the wafer and displaying the fringes on a display; and
    determining cutting lines on the wafer with reference to the positions of the fringes; and
    cutting the wafer along the cutting lines to obtain nonlinear optical crystal elements.

6. A method of manufacturing a nonlinear optical crystal element according to claim 5, wherein cutting lines correspond to positions where the phase difference is 0 or $\pi$.

7. A method of manufacturing a nonlinear optical crystal element according to claim 6, wherein each cutting line meets an expression:

$$m_\Delta x = s + t$$

where $\Delta x$ is the distance between a predetermined position where the phase difference is 0 and a position where the phase difference is $\pi$, $s$ is the size of the nonlinear optical crystal element, $t$ is the size of portions of the wafer to be cut off and removed, and $m$ is an integer.

8. A method of manufacturing a nonlinear optical crystal element according to claim 7, wherein the value of $m$ is in the range of 2 to 4 when the wavelength of the laser beam emitted by the ND:YAG laser is 1.064 µm, the difference $\Delta n(\omega)$ between refractive indices $n_c$ and $n_{ab}$ of the wafer for the laser beam at 20° C. is 0.08643, $s$ is 2 mm, $t$ is 0.3 mm and the predetermined angle between the extensions of the opposite surfaces of the wafer is in the range of 0.30° and 0.60°.

* * * * *